May 12, 1931.  E. P. BULLARD, JR  1,804,971
MULTIPLE SPINDLE CENTER TURNING MACHINE
Filed May 2, 1925    7 Sheets-Sheet 5
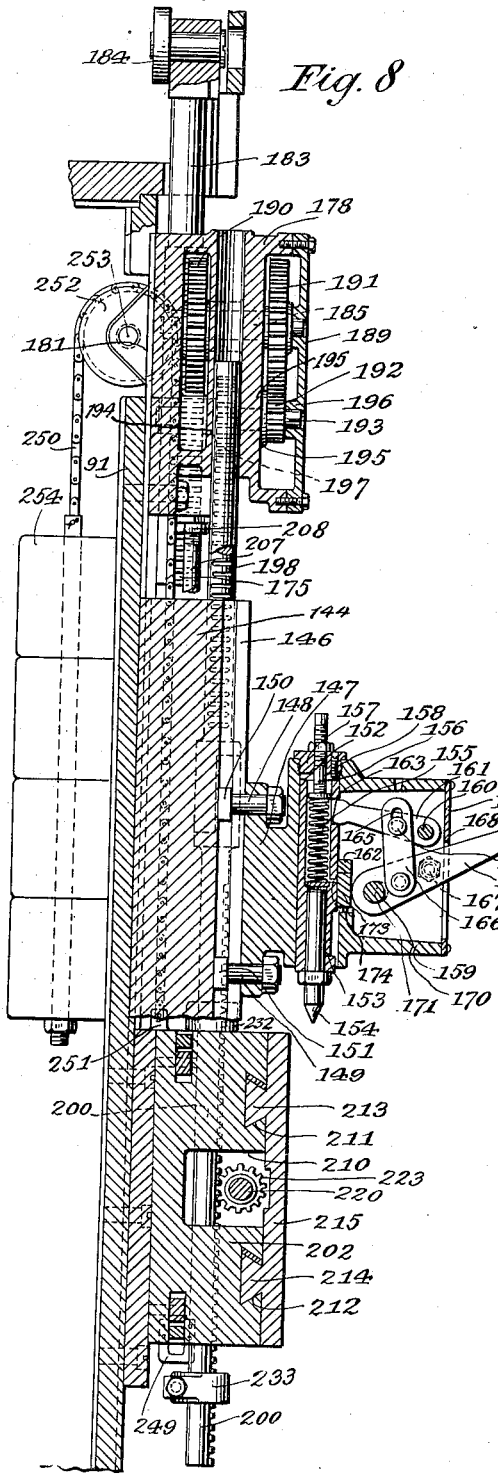
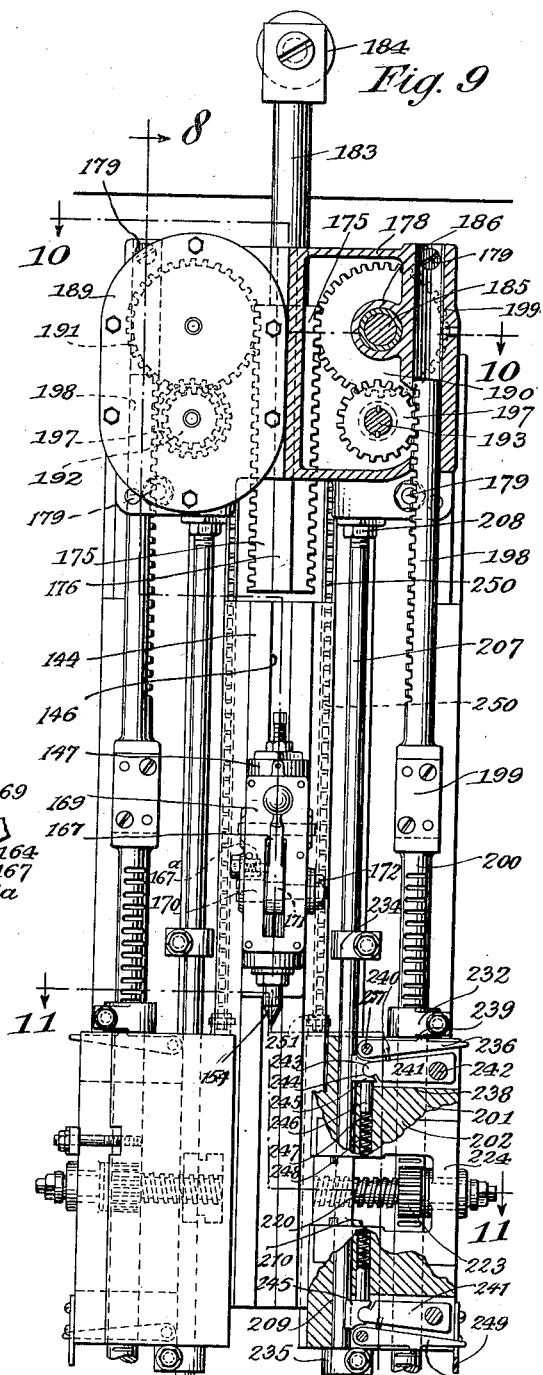
INVENTOR
Edward P. Bullard, Jr.
BY Chamberlain & Newman
ATTORNEYS

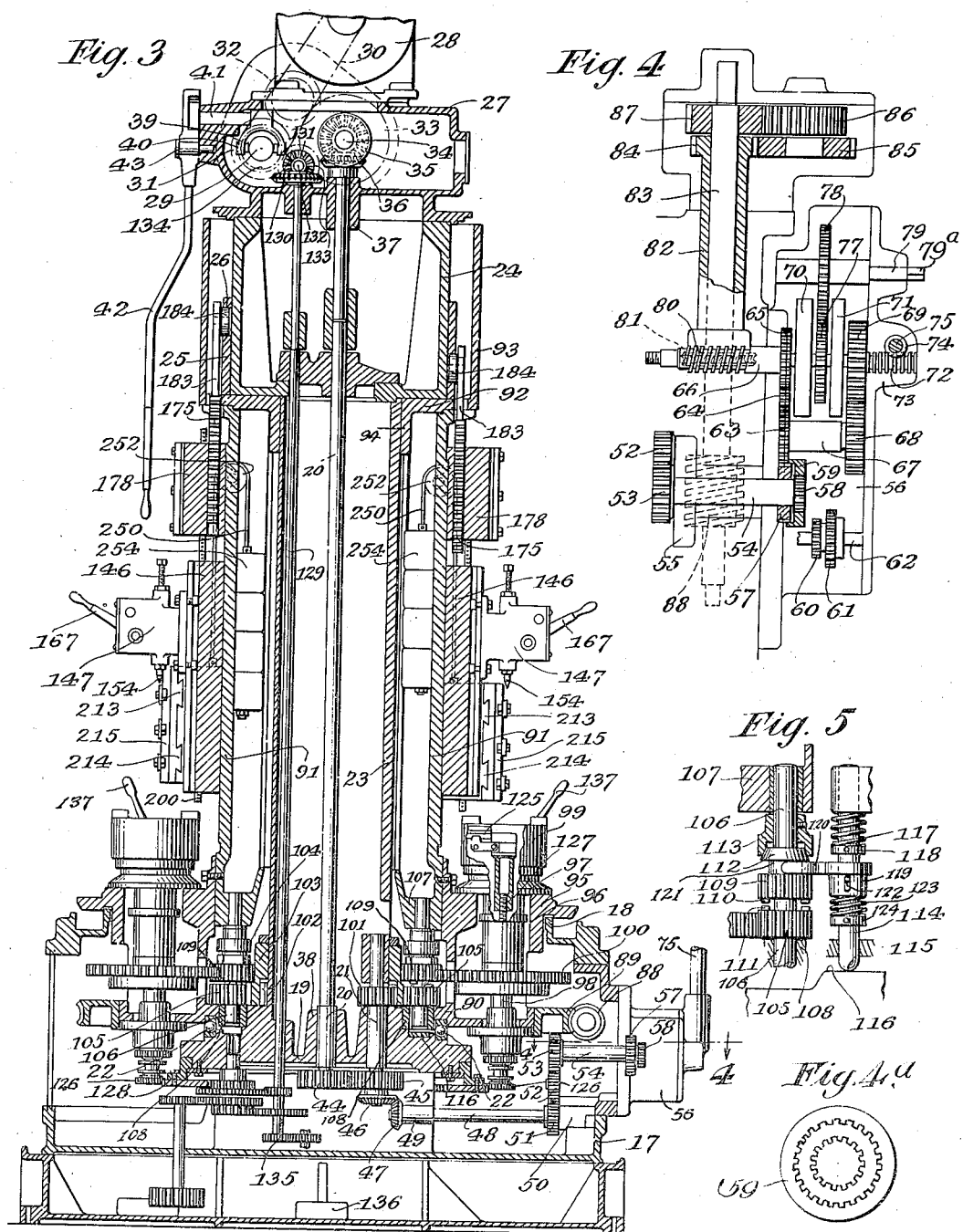

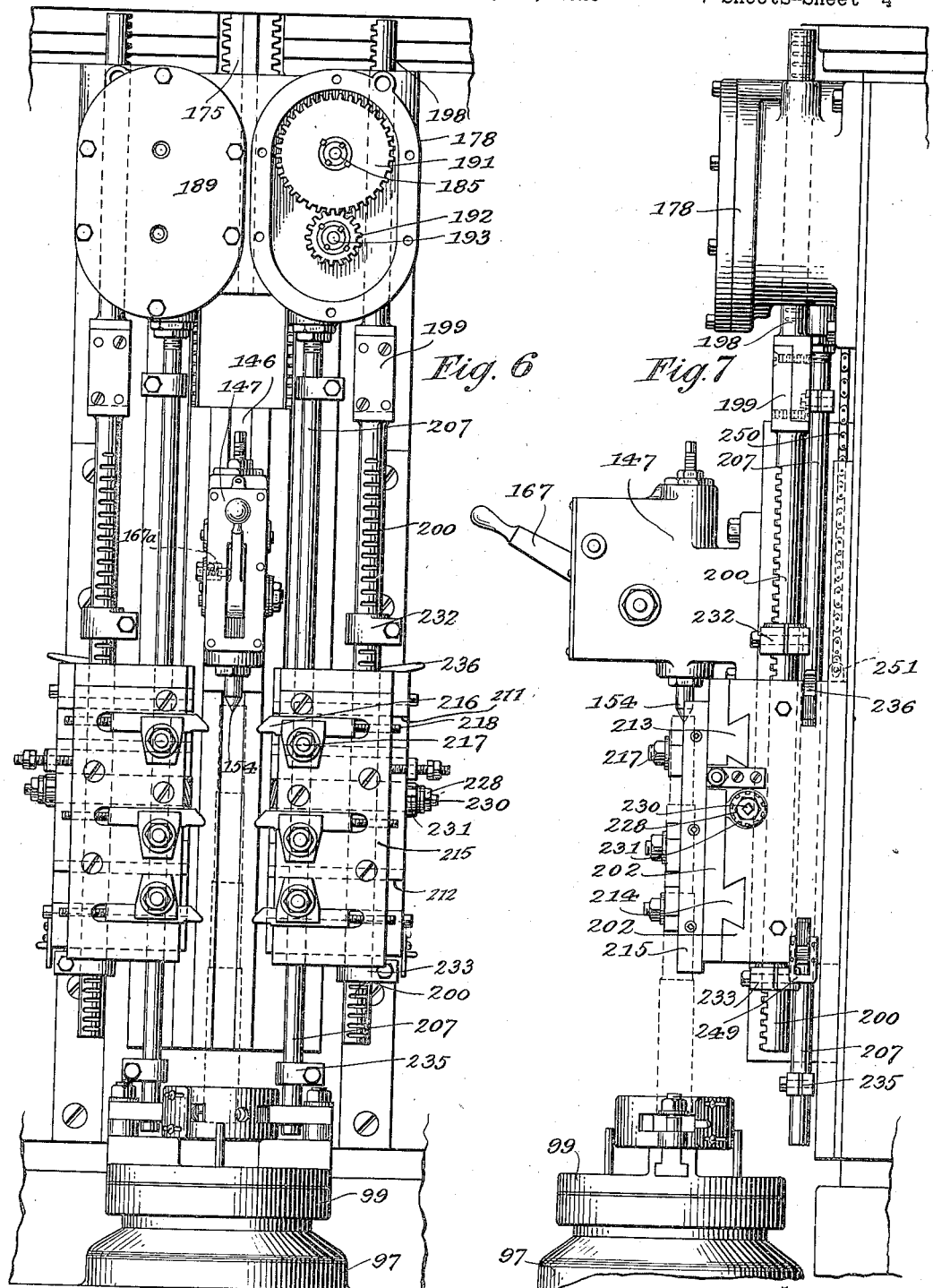

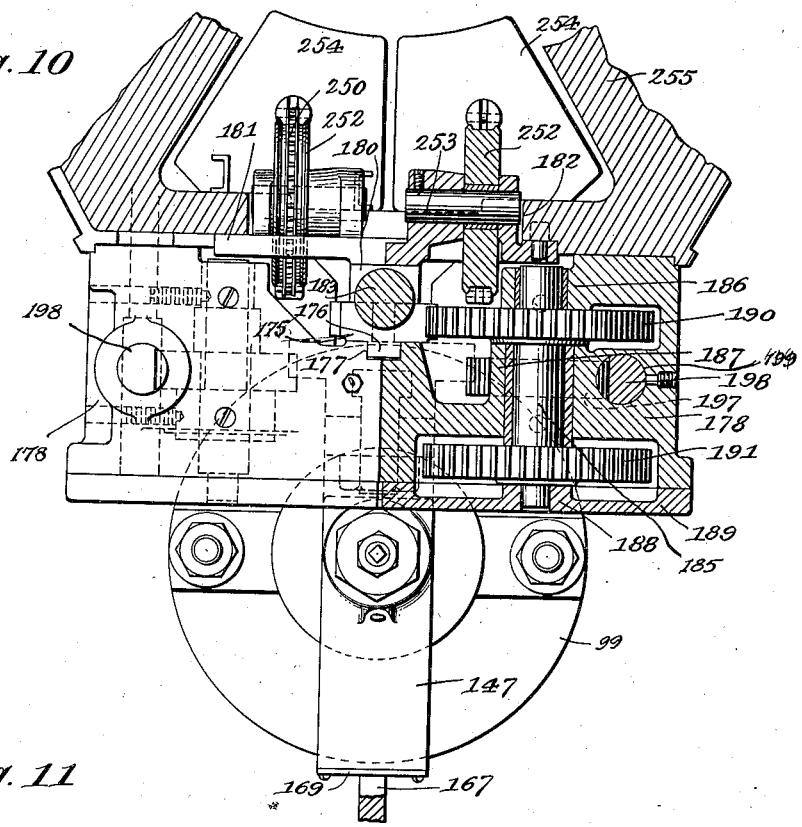
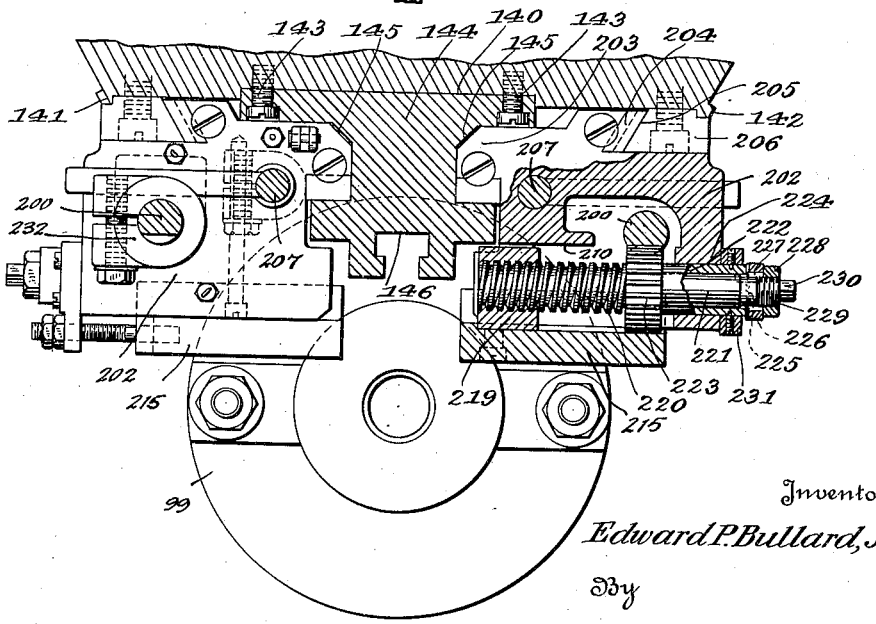

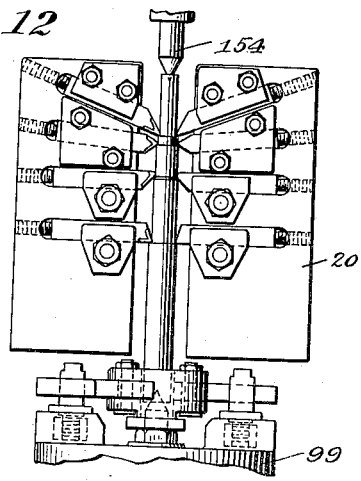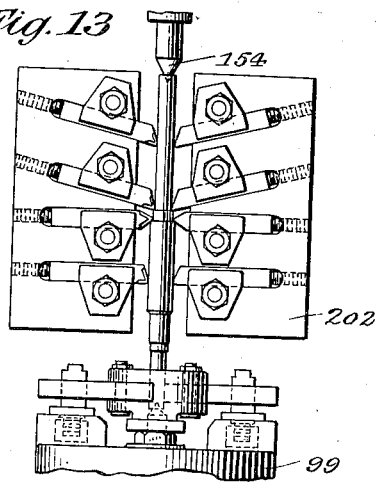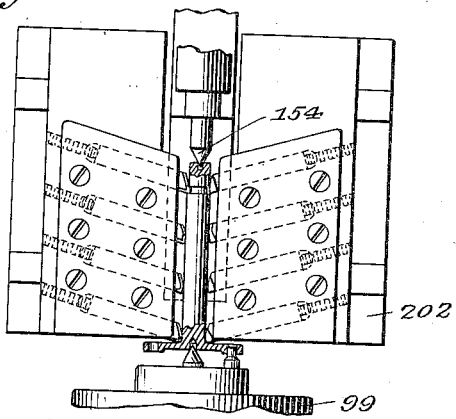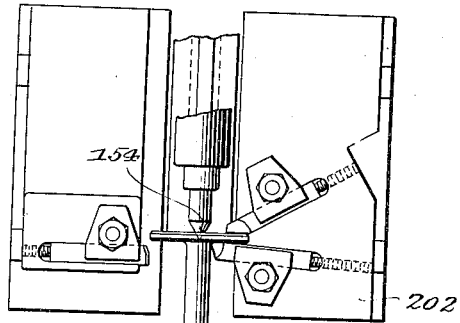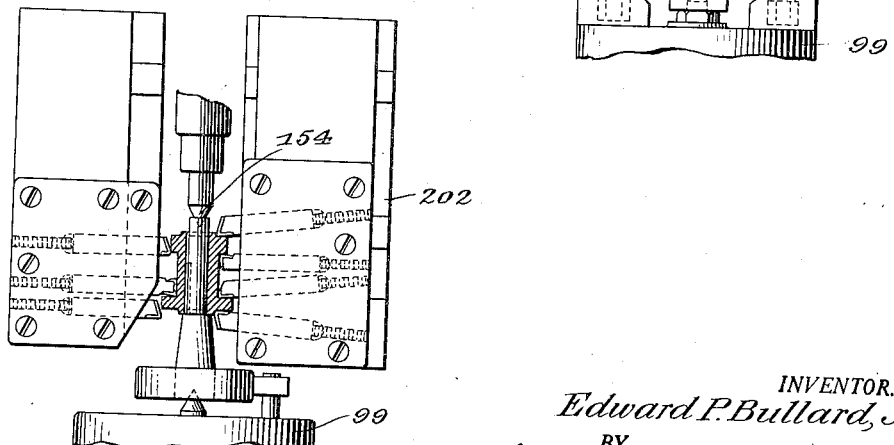

Patented May 12, 1931

1,804,971

UNITED STATES PATENT OFFICE

EDWARD P. BULLARD, JR., OF STRATFORD, CONNECTICUT, ASSIGNOR, BY MESNE ASSIGNMENTS, TO THE BULLARD COMPANY, OF BRIDGEPORT, CONNECTICUT, A CORPORATION OF CONNECTICUT

MULTIPLE SPINDLE CENTER TURNING MACHINE

Application filed May 2, 1925. Serial No. 27,348.

This invention relates to improvements in machine tools, and particularly a multiple spindle center turning machine.

The invention relates particularly to a type of machine employing a continuously driven rotary carrier, on which a series of rotating work carrying tables or supports are mounted, with tool slides in relation to each table in a manner to be carried by the carrier with the tables, so that a plurality of pieces of work may be machined at the same time, the pieces to be worked on being continuously supplied to the machine at a leading station as the finished pieces are removed.

It is proposed in the present invention to provide a machine of this type adapted for center turning work, that is, performing machining operations upon work which is supported at both ends between a chuck in the nature of a head stock and a center support in the nature of a tail stock.

A further object is to provide such a machine in which each work carrying table may be provided with tools adapted to perform different work, so that as each piece completes a single revolution, during which it has been operated upon by the tools of one table, it may be transferred to another table, this transferring operation being repeated with respect to each piece of work until it has been worked upon by the tools of all of the tables. This is desirable where the plant may have only one machine, and where a number of machining operations are to be performed upon a single piece. Where a number of machines are employed, the work may be so arranged that the tools of all of the work tables of one machine may perform the same machining operations, further operations being performed on other machines.

Another object is to provide a machine employing tools adapted to have movement both transversely and longitudinally of the work, and further to provide adjustment means for such tools by means of which the speed and relative extents of the transverse and longitudinal feeds may be predetermined independently with respect to the tools of each work table.

A further object is to provide a machine of this character in which a plurality of different sets of tools are adapted to operate simultaneously upon the same piece of work and in opposed relation to each other, to the end that the work is supported in opposed relation to the respective tools, so that the force of the tool is resisted and vibration and chattering is prevented. This is especially desirable when working upon thin stock, as, for instance, a small diameter relatively long shaft.

A further object is to provide an improved tool feed by means of which the tools move in engagement with the work in one direction only and in the other direction are spaced from the work so that the possibility of scoring the work on the return stroke is prevented.

With the above and other objects in view an embodiment of the invention is shown in the accompanying drawings and this embodiment will be hereinafter more fully described with reference thereto and the invention will be finally pointed out in the claims.

In the drawings:

Fig. 3 is a vertical sectional view, taken along the line 3—3 of Fig. 1;

Fig. 4 is a horizontal sectional view, showing the carrier drive gearing, and taken along the line 4—4 of Fig. 3;

Figure 1:
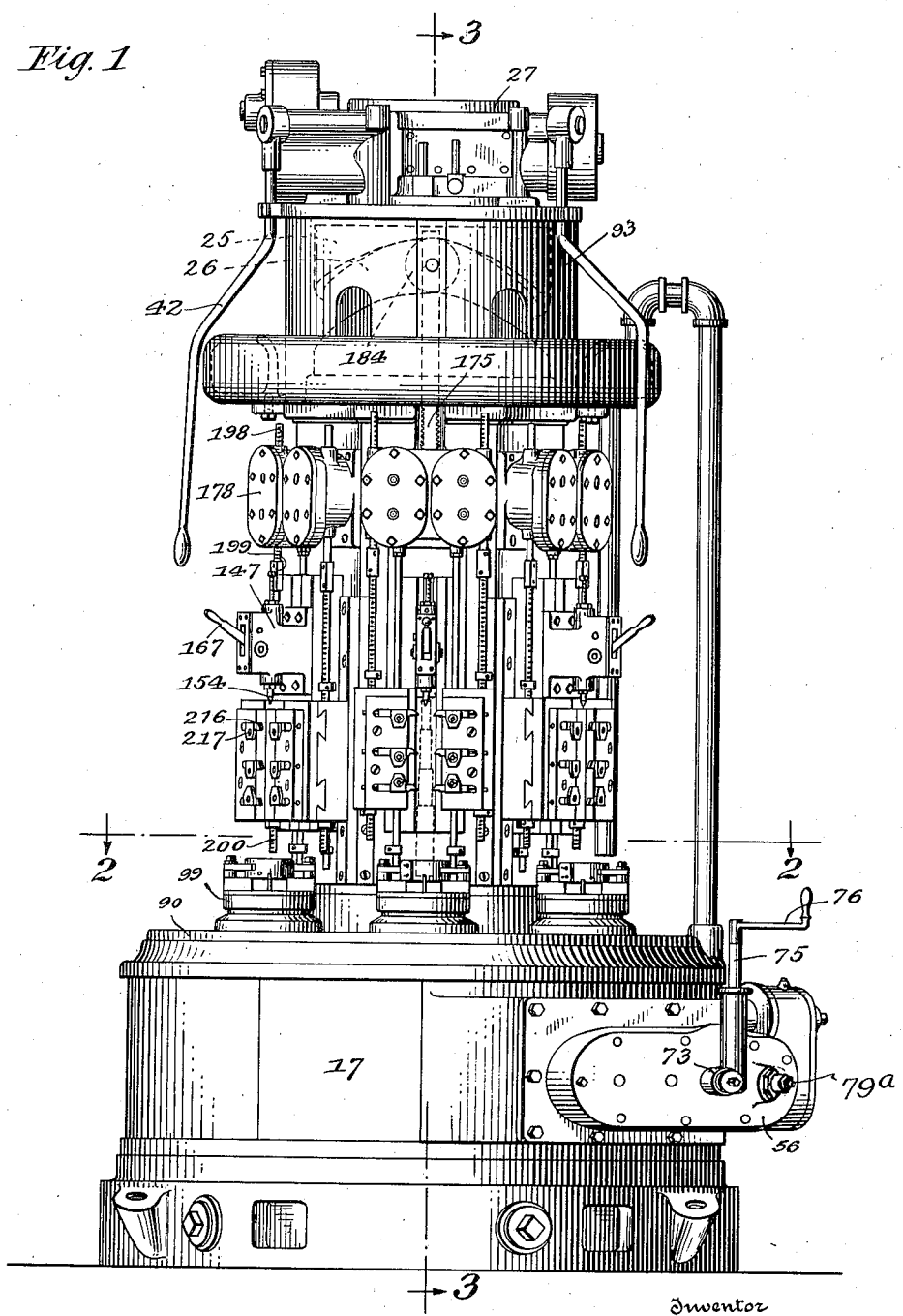
Fig. 1 is a front elevation of a machine tool, according to the present embodiment of the invention.

Fig. 4ª is a detail plan view of change gearing employed in the machine.

Fig. 5 is a detail vertical sectional view, showing the work spindle gear drive and gear shifting means for starting and stopping the rotation of the spindles;

Fig. 6 is an enlarged front elevation of one of the work supporting tables and the tool slides associated therewith;

Fig. 7 is a side elevation thereof;

Fig. 8 is a vertical sectional view of the tool slides and associated mechanisms, taken along the line 8—8 of Fig. 9;

Fig. 9 is a front elevation, partially in section, of the tool slides and associated mechanisms;

Fig. 10 is a plan view, partially in section, of the tool slide operating mechanism, taken along the line 10—10 of Fig. 9;

Fig. 11 is a plan view, partially in section, of the tool slides, taken along the line 11—11 of Fig. 9; and Figs. 12 to 16 are views in elevation, showing various types of work that may be performed on the machine, and tool arrangements therefor.

Similar reference characters indicate corresponding parts throughout the several figures of the drawings.

Figure 2:
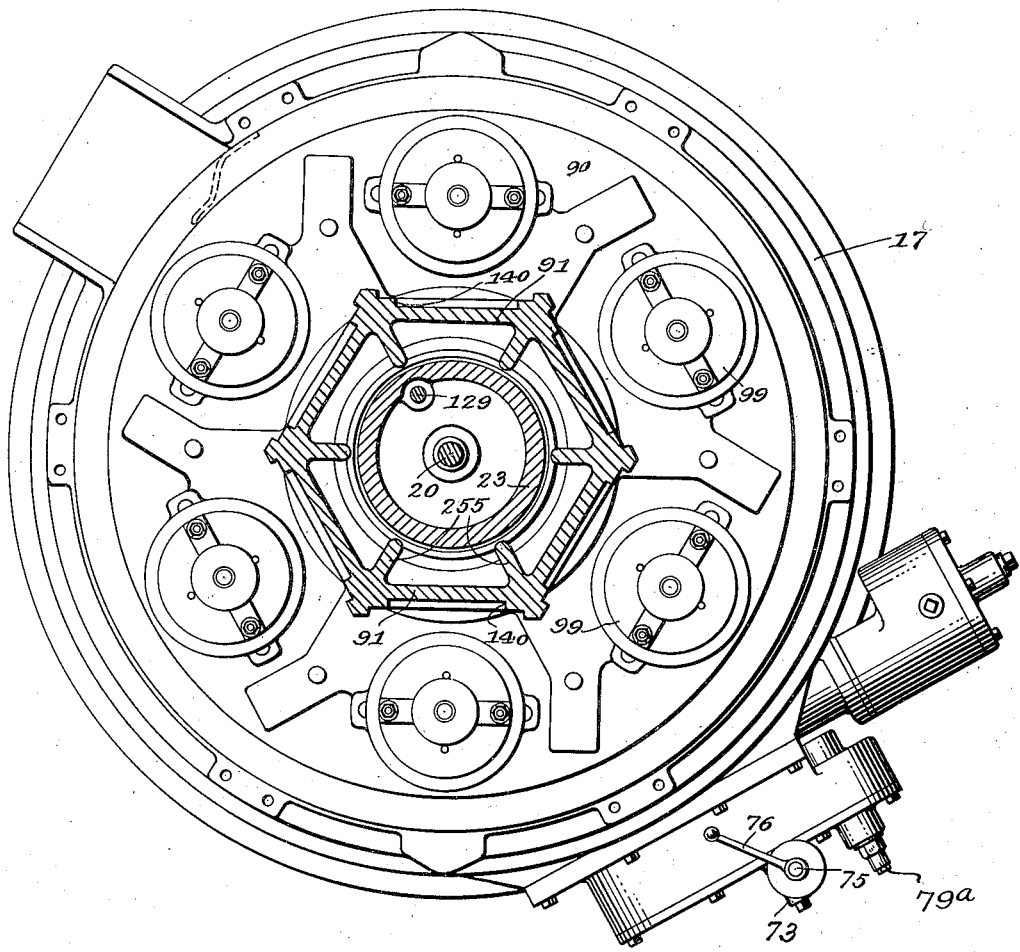
Fig. 2 is a horizontal sectional plan view, taken along the line 2—2 of Fig. 1.

Referring to the drawings and more particularly to Figs. 1, 2 and 3 thereof the machine comprises a base 17, the outer wall of which is substantially cylindrical and provided with a finished annular ledge 18 over which the carrier, hereinafter more fully referred to, is projected. The base further includes a supporting frame 19 for the work spindle driving shafts 20 and 21 and the ball bearings 22 for the carrier. A central cylindrical column 23 is secured to the base and has mounted at its upper end a cylindrical member 24 upon which there is supported a stationary cam drum 25 in the groove 26 of which the upper ends of the tool operating means carried upon the rotatable carrier are adapted to engage and be driven thereby.

Upon the cylindrical member 24 there is supported and secured a super-structure or frame 27 upon which the driving motor 28 for operating the machine is secured. An intermediate shaft 29 is journaled in the frame 27 below and parallel with the motor shaft and by which it is driven through the medium of a belt 30. Upon this shaft 29 is mounted a gear 31 which meshes with and drives a pinion 32, which in turn meshes with and drives a gear 33 mounted upon a stud shaft 34, and upon which stud shaft there is provided a beveled gear 35 meshing with and driving a beveled gear 36 mounted upon the upper end of the main driving shaft 20, positioned centrally in the machine and extending vertically through the column 23 and having an upper bearing 37 in the upper frame structure and a lower bearing 38 in the supporting frame of the base. The intermediate driving shaft 30 is provided with a clutch 39 adapted to be shifted by means of a fork 40 provided with a shaft 41 adapted to be operated by means of a depending lever 42 pivotably mounted at 43 upon the super-structure.

Upon the lower end of the main drive shaft 20 there is mounted a gear 44 that meshes with and drives a gear 45 secured to the short vertical shaft 21, and upon the lower end portion of the shaft 21 is secured a beveled pinion 46 that meshes with and drives a beveled pinion 47 mounted upon a shaft 48 journaled in suitable bearings 49 and 50 of the base and provided at its outer end with a gear 51 which meshes with an idler gear 52, and which in turn meshes with a gear 53 provided upon the end of a shaft 54 journaled in a suitable bearing 55 of the base and extending at its outer end into a gear box 56 where it is provided with change gears 57 and 58. The gear 58 is tight upon the shaft 54 while the gear 57 is loosely mounted thereon, but is normally connected to rotate with the shaft by means of a special form removable collar 59 which serves to lock the two gears 57 and 58 together. In order to increase the relative speed of the gear 57 so as to decrease the speed of the rotatable carrier, which said gearing is adapted to drive, intermediate change speed gears 60 and 61 are slidably mounted upon a shaft 62 and are adapted to be slid into mesh with the gears 57 and 58, in which relation the collar 59 is removed out of locking relation with the gear 57, so that the latter is free upon the shaft 54, and through this chain of gears the gear 67 is driven at relatively slower speed than the shaft 54. The gear 57 meshes with and drives a gear 63 which through an idler pinion 64 drives a gear 65 loosely mounted upon a worm drive shaft 66. The gear 63 is mounted upon one end of a shaft 67 upon the other end of which is provided a gear 68 which meshes with a gear 69 loosely mounted upon the worm shaft 66, and which rotates in opposed direction to the direction of rotation of the gear 65. Between the gears 65 and 69 there are provided shiftable clutches 70 and 71 having a toothed operating shaft 72 having sliding bearing in a bearing portion 73 of the gear box, and with which is engaged the lower pinion end 74 of a vertical shaft 75 provided with an operating handle 76 and by means of which the operator of the machine may by turning the shaft 75 in one of the other directions connect either the gear 65 or the gear 69 to the worm shaft 66, and thereby cause its rotation in one of the other directions, depending upon the direction in which it is desired to have the carrier rotate.

The shaft 76 is furthermore provided between the clutches 70 and 71 with a gear 77 meshing with a gear 78 provided upon a horizontal shaft 79 having a projecting end 79ª upon which a hand wrench may be engaged to rotate the carrier manually in either direction when desired.

The worm 80 of the worm shaft 66 meshes with a worm gear 81 provided upon one end of a sleeve 82 rotatably engaged upon a shaft 83, said sleeve being provided at its other end with a pinion 84 meshing with a gear 85, and which carries a gear 86 meshing with a gear 87 provided upon the end of the shaft 83. The shaft 83 is provided with a worm 88 which meshes with and operates a large annular worm gear 89 attached to the base of the carrier 90 for the purpose of continuously rotating the same.

The carrier 90 is rotatably supported upon the base and includes a vertical column 91 of polygonal cross section, hexagonal in the present embodiment, and which rotatably surrounds the column 23, the column 71 being secured at its lower end to the carrier and secured at its upper end to the lateral portion 92 of a member 93 surrounding the cam 25 in spaced relation, and provided at the inner periphery of said portion 92 with an annular bearing portion 94 engaging the upper portion of the column 23.

The lower portion 90 of the carrier, as will be seen, is of considerably larger diameter than the upper portion 91 and includes an annular table 95 provided at equally spaced points with bearing openings 96 in which the work supporting tables 97, in which the lower ends of the work are adapted to be held and supported, are secured.

Within each work table there is rotatably mounted a central spindle 98 provided at its upper end with a chuck head 99 and at its lower end with a gear 100. The several spindles are adapted to be driven by the shaft 21 and for this purpose said shaft is provided with a gear 101 which meshes with the internal teeth 102 of a ring gear 103 rotatably mounted upon the column 23 and having its outer teeth 104 meshing with a gear 105 mounted adjacent each spindle upon a fixed shaft 106 mounted at its ends in suitable supports 107 and 108 formed upon the carrier.

Upon the shaft 106 there is loosely mounted a gear 109 (Fig. 5) meshing with the gear 100 of the work table spindle, and adapted to have vertical sliding movement on said shaft, being provided on its under side with beveled clutch teeth 110 which mesh with beveled clutch teeth 111 on the gear 105, and through which the gears are driven together, and the spindle gear 100 thereby rotated. By raising the gear 109 the clutch teeth are disengaged, and in such raised position a cone brake member 112 on the gear 109 engages a cone brake member 113 on the shaft 106 to cause stoppage of the rotation of the spindle, this stoppage occurring during the period of movement of the tables in relation to the unloading and loading station.

In order to effect such raising and lowering movement of the gear 109 there is mounted in the carrier, in parallel and spaced relation to each shaft 106, a vertically movable shaft 114 provided at its lower end with a contact portion 115 adapted to engage a stationary circumferentially arranged cam 116 mounted on the stationary frame 19 in relation to the unloading and loading station, the shaft 114 adapted to be lifted as it passes in relation to said station. A spring 117, mounted on the shaft between the upper bearing and a fixed ring 118 normally presses the shaft downwardly, and through a collar 119 mounted on the shaft and a forked extension 120 thereof engaging an annular groove 121 of the gear 109, presses said gear into locking engagement with the gear 105. The collar 119 has limited sliding movement by means of a pin and slot connection 122, and is normally pressed upwardly against the ring 118 by means of a spring 123 provided between the under side of the collar and a fixed ring 124. As the shaft 114 is raised by the cam 116, compressing the spring 117, the gear 109 is disengaged from the gear 105, and, as the brake portions 112 and 113 engage, the collar 119 is held against further upward movement with the shaft 114, and the spring 123, therefore, presses the brake portions into gradually tightening relation. In the engaged position of the gear 109 with the gear 105, the spring 117 permits of a yielding relation between the beveled clutch teeth 110 and 111, so that if there is any obstruction to the normal rotation of any one of the work tables, the gears will be separated automatically, and jamming or breakage of the machine prevented.

Within the chuck head of each work table there are provided radially disposed work gripping jaws 125 adapted to be moved into gripping and releasing position through power driven means including a gear 126 provided at the lower end of a chuck operating shaft 127 mounted within the spindle and meshing with a ring gear 128 rotatably mounted in the base and adapted to be driven through suitable gearing by means of a vertical shaft 129 extending upwardly through the column 23 and provided at its upper end with a beveled pinion 13, which meshes with a beveled pinion 131 mounted upon a stud shaft 132, and upon which there is provided a gear 133 which meshes with a gear 134 provided upon the intermediate drive shaft 29. This shaft 129 is also preferably provided with a gear 135 for driving an oil pump 136 which may be connected in any suitable way to distribute oil to the various parts of the machine. The power chucking means is adapted to be operated at each station by means of a hand lever 137.

Inasmuch as the power chucking means per se does not form a part of the present invention, no further description is deemed necessary except to state that the operator throws the lever into one position to cause the power chuck to release the work and into the other position to cause the same to grip the work, so that the operators time may be used to the best advantage in loading and unloading the work, and the operation of the machine is greatly facilitated.

As before pointed out each of the chucks of the respective work tables is adapted to be gripped with the lower end of the work to rotate the same, while the upper end is centered and engaged by a center support. Tools are respectively associated with each work table and are adapted to be operated into and out of relation to the work.

While the type of tools and the operating speeds and the extent of the feeds of the tools may, according to the invention, be adjusted to vary with each work table, the mechanisms at each table are identical, so that only one of them will be described in detail.

The flat vertical face of the column 91 extending above the work table is provided with a vertical groove 140 and at each edge of said face there are provided vertical guide flanges 141 and 142. Within the recess 140 there is secured by means of bolts 143 a vertical guide member 144, provided at each of its vertical sides with guide channels 145, and at its front side with a T-slot channel 146, within which the center support frame member 147 for supporting the upper end of the work is mounted for vertical adjustment by means of bolts 148 and 149 having their headed ends 150 and 151 engaged in the T-slot 146 so that said member may be positioned at any desired distance from the work table, depending upon the particular character of the work being done. A vertical passage 152 is provided in said member which is axially aligned with the vertical axes of the work table, and within this passage there is slidably mounted a sleeve 153 having a cone centering point 154 secured in its lower end and provided in its upper hollow portion with a spring 155 engaged at its upper end by means of an adjustable stop screw 156 engaged in a bushing 157 screwed into the upper end of the passage 152.

This spring presses the member 153 downwardly to engage the cone point 154 with the work, and is adapted to be raised by manually operable means, presently to be described, to release the work, and in such raised position it is limited as to the extent of its upward movement by means of an adjustable set screw 158 provided in the bushing 157 and adapted to engage the upper end of the member 153.

The member 147 is provided forwardly of the passage 152 with a hollow projecting portion 159 within which there is mounted upon a shaft 160 a lever arm 161 projecting through an opening 162 in the wall of the passage 152 and rotatably engaged at its end in a pocket 163 formed in the upper portion of the member 153. The lever 161 is provided intermediate its ends with a pin 164 which is engaged by the slot 165 of a link 166 pivotally connected to a lever 167, mounted at its inner end for eccentric pivotal movement, and projecting at its outer end through a slot 168 in a cover plate 169 secured over the outer end of the portion 159.

The eccentric mounting for the lever 167 consists of a shaft 170 mounted for rotatable adjustment in the portion 159 and provided with an intermediate eccentric bearing portion 171 upon which the shaft is rotatably supported. The position of the shaft 170 is adapted to be fixed by means of a nut 172, so that by loosening the nut and turning the shaft, the degree of eccentricity of the portion 171 may be changed as desired. At its inner end the shaft is rounded in concentric relation to the portion 171 and eccentric relation to the ends of the shaft 170, and is adapted to bear upon a shoe 173 movably mounted in a passage 174 and adapted to be pressed into engagement with the member 153 in the manually raised movement of the lever 167 and to be released from said member in the manually lower position of said lever. In the raised position of the lever 167, as shown in Fig. 8, it is adapted to be yieldably retained by means of a spring pressed detent 167$^a$.

The tool carrying slides are mounted at the respective sides of the work in opposed and reversed relation to each other, so that both sets of tools are adapted to move into and out of relation with the work at the same time. They are both operated by means of a single vertically reciprocating rack 175 provided along both of its vertical side edges with teeth and slidably mounted by having a vertical rib 176 formed upon its forward face engaged in a groove 177 formed at the meeting inner vertical corners of the two gear housings 178 for the respective tool slides, these gear housings being secured upon the column by means of bolts 179. The rack is furthermore supported at its rear face by means of a vertical rib 180 formed upon a plate 181 bolted upon the column and covering an opening 182 therein.

The rack 175 is secured at its upper end to the lower end of a shaft 183, provided at its upper end with a roller 184 which engages the cam groove 26 of the cam 25. Inasmuch as the tool slides and their operating mechanisms are of identical construction, only one will be described in detail, it being understood that their operating mechanisms within the respective gear boxes 178 are engaged with the respective teeth at each side of the rack 175.

Within the gear box 178 a transverse shaft 185 is journaled in bearings 186, 187 and 188, the latter bearing being formed in the cover plate 189 of the box, and upon this shaft and between the bearings 186 and 187 there is provided a large gear 190 which meshes with the teeth of the rack 175. Upon the shaft and between the bearings 187 and 188 there is provided another large gear 191 which meshes with and drives a pinion 192 mounted upon a shaft 193 journaled in bearings 194, 195 and 196, the latter bearing being provided in the cover plate 189, and between the bearings 194 and 192 of said shaft 193 a gear 197 is mounted, which meshes with and is adapted to reciprocate a vertical cylindrical rack 198 slidable at its upper end in a cylindrical guide passage 199 formed in the gear box. The gears 191 and 192 are change gears, that is, they may be removed upon removal of the cover plate 189 and replaced by gears of different ratios, so as to change the relative speed of reciprocation of the rack 198 with respect to the speed of the rack 175, so that the several tool operating racks 198 of the machine may have their speeds regulated independently of each other. The rack 198 is connected by means of a coupling 199 with another rack 200, having its teeth turned 90° with respect to the teeth of the rack 198, this rack 200 extending downwardly through a vertical passage 201 of the tool slide carrier 202. The tool slide carrier is slidably mounted by means of flanged portions 203 and 204 within the channel 145 and a channel 205 formed by means of a vertical guide and retaining gib 206 bolted to the column at its edge adjacent the edge flange 142. A vertical guide rod 207 is secured to the underside of the gear box 178 at 208 and extends downwardly through a passage 209 in the tool slide carrier.

Upon the face of the tool slide carrier and above and below a centrally disposed pocket 210 there are provided dove-tailed slideways 211 and 212 in which are engaged the dove-tailed ribs 213 and 214 of the tool slide 215, and upon which tool slide the tools 216 are adapted to be secured by suitable bolting means 217, and adjusted by means of set screws 218. Upon the inner face of the tool slide there is secured a nut 219 in which is engaged a threaded worm 220 having a spindle portion 221 extended through the hub 222 of a pinion 223 which meshes with the teeth of the rack 200, said hub being freely rotatable in a bearing portion 224 of the tool slide carrier. The gear 223 is normally fixed with relation to the worm and is adapted upon rotation to rotate the worm and thereby reciprocate the tool slide transversely. It may, however, be disconnected therefrom for independent adjustment of either the worm or the gear, to adjust either the transverse position of the tool slide or the vertical position of the tool slide carrier; and for this purpose the projecting outer end of the hub 222 is provided with teeth 225 which are engaged by the teeth 226 of a collar 227 disposed between the hub and a nut 228 screwed upon the outer threaded end 229 of the spindle 221, the end of the spindle being also provided with a squared projecting portion 230 adapted to be engaged by a suitable wrench. The hub 222 has secured to its projecting portion a notched collar 231 which may be engaged by a spanner wrench for the purpose of turning it. When it is desired to independently rotate either the worm 220 or the gear 223 for the purpose of adjustment, the nut 228 is turned outwardly to release the locking collar 227 from the hub 222, and thereupon a spanner wrench may be engaged with the collar 231 and another suitable wrench with the squared end 230, and the worm and gear may thus be independently turned as desired.

In the operation of the tool slide the relative movement of the rack 200 through the tool slide carrier will cause rotation of the gear 223 and the worm 219 and produce either inward or outward movement of the tool slide, depending upon the direction of the relative movement of the rack, while movement of the rack with the tool slide carrier will produce a vertical up or down movement of the tool slide, depending upon the direction of the movement of the rack; the normal operation of the slide being first a movement inwardly into engagement with the work, a movement downwardly taking a cut from the work, a movement outwardly out of engagement with the work, and a movement upwardly to its first position, and from which it again moves inwardly into relation with the work. It will be understood that in certain kinds of work the horizontal movement may be in cutting relation with the work.

The rack 200 has adjustably mounted thereon, above and below the tool slide carrier, stop collars 232 and 233, the position of which determine the points at which the relative movement of the rack through the tool slide carrier ceases and the movement of the rack with the tool slide carrier begins; and upon the vertical guide rod 207 there are also provided similar adjustable collars 234 and 235 which determine the limits of the vertical movement of the tool slide carrier.

At the upper and lower ends of the tool slide carrier there are provided locking and releasing mechanisms adapted to be operated by the stop collars 232 and 233 of the rack 200. The upper mechanism consists of a lever 236 pivotably mounted at 237 within a recess 238 formed in the carrier and provided at its upper side with a contact lug 239 for engagement with the collar. Between said lug and the pivot 237 there is provided an adjustable contact screw 240 which bears upon the lever 241 near its inner end, said lever being reversely disposed with respect to the lever 236 and pivotably mounted in the outer end of the pocket 238 at 242. At its inner end the lever 241 is provided with a rounded nose 243, which is engaged in a recess 244 of a shoe 245 bearing upon the surface of the guide rod 207, and normally pressed upwardly by means of a plunger 246 provided in a passage 247 and having a spring 248 pressing it into engagement with the shoe. The nose 243 of the lever 241 is slightly below the horizontal plane passing through the axis of the pivot 242 so that upward pressure of the plunger 246 tends to straighten out the lever 241 and tightly press the shoe 245 against the guide rod 207 thereby locking the position of the tool slide carrier. This locking action of the upper locking and releasing mechanism is effective against downward pressure upon the tool slide, but is such that upward pressure upon the tool slide will cause the lever 241 to be rotated in a direction to release the shoe and therefore permit such upward movement.

The upper locking and releasing mechanism may thus be either released by upward pressure upon the tool slide or by downward pressure upon the lever 236 which is effected by contact of the stop collar 232 therewith. The lower locking and releasing mechanism is of exactly the same construction but reversed in position, and the same reference characters are given to this lower mechanism, the action of which is to release during the downward pressure of the carrier and upon upward pressure upon the lever 236. The lever 236 of the lower mechanism is limited in its downwardly swung position by means of a keeper 249 secured to the carrier.

The tool slide is counter-balanced, and for this purpose a chain 250 is connected thereto at 251, and is carried over a roller 252 journaled upon a shaft 253 mounted in the plate 181, being connected at its end to a counterweight 254 disposed within the column 91, in which said channels are formed for guiding the weights by means of radial flanges 255.

The operation of the tool slide is as follows:

Assuming a starting position in which the upper end of the slide abuts the stop collar 234 upon the rod 207, the stop collar 232 of the rack 200 is in spaced relation above the upper end of the tool slide carrier, and the carrier is locked in stationary relation by means of the locking shoes 245. As the rack moves downwardly through the stationary tool slide carrier it rotates the gear 223 and worm 220 and causes the tool slide to move inwardly into engagement with the work, this inward movement as above pointed out, being utilized in certain types of work for performing transverse cutting operations upon the work. This continues until the collar 232 contacts with the lever 236, depressing it and releasing the shoe 245, so that the continued downward movement of the rack causes the tool slide to move downwardly with it, the lower locking shoe 245 being released through the downward pressure of the slide, and during this movement the tool is moved downwardly in relation to the work. Upon completion of the downward movement of the rack and tool slide carrier the rack starts its upward movement, whereupon the stop collar 232 moves out of engagement with the upper locking and releasing mechanism so that the shoe 245 locks against the guide rod 207, and the rack therefore moves through the tool slide carrier and causes the gear 223 and the worm 220 to be rotated in a direction to move the tool slide out of relation with the work, this movement continuing until the lower stop collar 233 engages the lever 236 of the lower locking and releasing mechanism, causing the lower locking shoe 245 to be released from the guide rod 207, whereupon the tool slide carrier is moved upwardly with the rack, the upper locking and releasing mechanism being released through upward pressure of the tool slide carrier, this upward movement continuing until the rack reaches the limit of its upward movement, whereupon the cycle is completed.

The tool slide at the other side of the work is operated simultaneously in a similar manner, so that tools are engaged with the work simultaneously at both sides, and the same is therefore supported in opposed relation to each set of tools and any tendency of the work to chatter or vibrate is eliminated.

It will be understood that the relative movements of the respective tool slides at each side of the work may be regulated as desired, so that a roughing cut may be made on one side and a finishing cut on the other, or different portions of the work machined in different ways. As above pointed out the tool slides at each station may be equipped with similar tools so that the work performed at each table is identical and in which case the operator removes a piece from each table as it comes into place and replaces it with a new piece, the output of such a machine being five pieces in a six table machine for each rotation of the carrier, there being five tables that are continuously working and one station that is being loaded and unloaded. In certain types of work it is desirable to provide different tools at each table adapted to perform successive machining operations on the same piece of work, and in such case the operator will remove a piece of work from one table after it has passed around the machine and place it in the preceding table from which he has just removed another piece, this piece being successively advanced during each revolution of the carrier until it has been worked upon by the tool of each table, and being then removed from the machine. In operating a machine in this manner its output would be one piece of work for each revolution of the carrier, providing each table performs different work, or it may be two pieces for each revolution if pairs of the tables perform the same work.

In Figs. 12 to 16 several samples of the type of work that may be performed upon the machine are illustrated, together with tool arrangements therefore.

I have illustrated and described a prefered and satisfactory embodiment of the invention, but it is obvious that changes may be made therein, within the spirit and scope thereof, as defined in the appended claims.

Having thus described my invention, what I claim and desire to secure by Letters Patent is:—

1. In a center turning machine tool a continuously rotating carrier, a plurality of rotatable work holders carried thereby, a non-rotatable tool holder also mounted on the carrier and adapted to have reciprocatory movement at an angle to the axis of the work holder, means for reciprocating said tool holder, and change speed means between said last means and said tool holder whereby the speed of the tool holder may be varied with respect to said last means.

2. In a center turning machine tool a continuously rotating carrier, a plurality of rotatable work holders carried thereby, a non-rotatable tool holder also mounted on the carrier, means for successively reciprocating said tool holder in two directions, one being at an angle to the axis of said work holder, and means whereby the relative speed of said successive reciprocatory movements may be varied with respect to each other.

3. In a center turning machine tool a continuously rotating carrier, a plurality of rotatable work holders carried thereby, a non-rotatable tool holder also mounted on the carrier, means for successively reciprocating said tool holder at an angle to and parallel to the axis of said work holder, and means whereby the relative extents of said successive reciprocatory movement may be varied with respect to each other.

4. In a center turning machine tool a continuously rotating carrier, a plurality of rotatable work holders carried thereby, a plurality of non-rotatable tool holders also mounted on the carrier and disposed in opposed relation and adapted to engage the work at opposed sides, and automatic means for reciprocating said tool holders into and out of relation with the work.

5. In a center turning machine tool a continuously rotating carrier, a plurality of rotatable work holders carried thereby, a plurality of non-rotatable tool holders also mounted on the carrier and disposed in opposed relation and adapted to engage the work at opposed sides, automatic means for reciprocating said tool holders into and out of relation with the work, and means whereby the relative speeds of said respective tool holders may be varied with respect to each other.

6. In a center turning machine tool a continuously rotating carrier, a plurality of rotatable work holders carried thereby, a plurality of non-rotatable tool holders also mounted on the carrier and disposed in opposed relation and adapted to engage the work at opposed sides, automatic means for reciprocating said tool holders into and out of relation with the work, and means whereby the relative extents of movement of said respective tool holders may be varied with respect to each other.

7. In a center turning machine tool a continuously rotating carrier, a plurality of rotatable work holders carried thereby, a plurality of non-rotatable tool holders also mounted on the carrier and disposed in opposed relation and adapted to engage the work at opposed sides, means for successively reciprocating said tool holders at each side in two directions, one being at an angle to the axis of said work holder, and means whereby the relative speeds of the reciprocating movements may be varied with respect to each other.

8. In a center turning machine tool a continuously rotating carrier, a plurality of rotatable work holders carried thereby, a plurality of non-rotatable tool holders also mounted on the carrier and disposed in opposed relation and adapted to engage the work at opposed sides, means for successively reciprocating said tool holders at each side in two directions, one being at an angle to the axis of said work holder, and means whereby the relative extents of the reciprocating movements may be varied with respect to each other.

9. In a center turning machine tool a continuously rotating carrier, a plurality of rotatable work holders carried thereby for supporting and rotating the work at one end, a plurality of center supports adapted to be engaged with the work at the other end, a plurality of non-rotatable tool holders mounted on the carrier in relation to each work holder and disposed in opposed relation and adapted to engage the work at opposed sides, and automatic means for reciprocating said tool holders into and out of relation with the work.

10. In a center turning machine tool a continuously rotating carrier, a plurality of rotatable work holders carried thereby for supporting and rotating the work at one end, a plurality of center supports also mounted on the carrier and adapted to support the work at the other end and including a support, a centering element movably mounted in said support for movement axially of the rotatable work holder, spring means for engaging said element with the work, and manually operable means for disengaging said element from the work, a non-rotatable tool holder also mounted on the carrier in relation to each work holder, and means for reciprocating said tool holder at an angle to the axis of said work holder.

11. In a center turning machine tool a continuously rotating carrier, a plurality of rotatable work holders carried thereby for supporting and rotating the work at one end, a plurality of center supports also mounted on the carrier and adapted to support the work at the other end and including a support mounted for adjustment to and from said work holder, a centering element movably mounted in said support for movement axially of the rotatable work holder, means for engaging said element with the work, and manually operable means for disengaging said element from the work, a non-rotatable tool holder also mounted on the carrier in relation to each work holder, and means for reciprocating said tool holder at an angle to the axis of said work holder.

12. In a center turning machine tool a continuously rotating carrier, a plurality of rotatable work holders carried thereby for supporting and rotating the work at one end, a plurality of center supports also mounted on the carrier and adapted to support the work at the other end and including a support, a centering element movably mounted in said support for movement axially of the rotatable work holder, spring means for engaging said element with the work, manually operable means for disengaging said element from the work, and yieldable means for retaining said element in its disengaged position, a non-rotatable tool holder also mounted on the carrier in relation to each work holder, and means for reciprocating said tool holder at an angle to the axis of said work holder.

13. In a center turning machine tool a continuously rotating carrier, a plurality of rotatable work holders carried thereby for supporting and rotating the work at one end, a plurality of center supports adapted to support the work at the other end and including a support, a centering element movably mounted in said support for movement axially of the rotatable work holder, spring means for engaging said element with the work, manually operable means for disengaging said element from the work, holding means operated by said manually operable means adapted to retain the element against the force of said spring means, and yieldable means for retaining said manually operable means in its disengaging position, a non-rotatable tool holder also mounted on the carrier in relation to each work holder, and means for reciprocating said tool holder at an angle to said work holder.

14. In a center turning machine tool a continuously rotating carrier, a plurality of rotatable work holders for supporting and rotating the work at one end, a plurality of center supports adapted to support the work at the other end and including a support, a centering element movably mounted in said support for movement axially of the rotatable work holder, spring means for engaging said element with the work, a lever adapted to be operated to disengage said element from the work, a manually operable lever for operating said first mentioned lever, holding means for retaining said element in disengaged position against the force of said spring, eccentric means carried by said manually operable lever adapted to operate said holding means, and yieldable means for retaining said manually operable lever in its disengaging position, a non-rotatable tool holder also mounted on the carrier in relation to each work holder, and means for reciprocating said tool holder at an angle to the axis of said work holder.

15. In a centering machine tool a continuously rotating carrier, a plurality of rotatable work holders, a sliding tool support mounted for reciprocatory movement in parallel relation to the axis of each of said work holders, a tool slide carried by said support adapted to have reciprocatory movement at an angle to the axis of said work holder, means adapted to have movement relatively to said support and adapted to impart reciprocatory movement to said tool slide during said relative movement, and means adapted at a predetermined point in the movement of said last means to cooperatively connect said support thereto, whereby said support has movement with said last means.

16. In a center turning machine tool a continuously rotating carrier a plurality of rotatable work holders carried thereby, a sliding tool support mounted for reciprocatory movement in parallel relation to the axis of each of said work holders, a tool slide carried by said support adapted to have reciprocatory movement at an angle to the axis of said work holder, means adapted to have movement relatively to said support and adapted to impart reciprocatory movement to said tool slide during such relative movement, and adjustable means adapted at a predetermined point in the movement of said last means to cooperatively connect said support thereto, whereby said support has movement with said last means.

17. In a center turning machine tool a continuously rotating carrier, a plurality of rotatable work holders carried thereby, a sliding tool support mounted for reciprocatory movement in parallel relation to the axis of each of said work holders, a tool slide carried by said support adapted to have reciprocatory movement at an angle to the axis of said work holder, reciprocatory means adapted to have movement relatively to said support and adapted to impart reciprocatory movement to said tool slide during such relative movement, and means adapted at predetermined points in the respective to and fro movements of said last means to cooperatively connect said support thereto, whereby said support has movement with said last means.

18. In a center turning machine tool a continuously rotating carrier, a plurality of rotatable work holders carried thereby, a sliding tool support mounted for reciprocatory movement in parallel relation to the axis of each of said work holders, a tool slide carried by said support adapted to have reciprocatory movement at an angle to the axis of said work holder, reciprocatory means adapted to have movement relatively to said support and adapted to impart reciprocatory movement to said tool slide during such relative movement, and adjustable means adapted at predetermined points in the respective to and fro movement of said last means to cooperatively connect said support thereto, whereby said support has movement with said last means.

19. In a center turning machine tool a continuously rotating carrier, a plurality of rotatable work holders carried thereby, a sliding tool support mounted for reciprocatory movement in parallel relation to the axis of each of said work holders, a tool slide carried by said support adapted to have reciprocatory movement at an angle to the axis of said work holder, releasable means adapted to fix the position of said tool support, means adapted to have movement relatively to said support and adapted to impart reciprocatory movement to said tool slide during such relative movement, and means adapted at a predetermined point in the movement of said last means to release said releasable means, whereby said means has movement with said last means.

20. In a center turning machine tool a continuously rotating carrier, a rotatable work holder carried thereby, a sliding tool support mounted for reciprocatory movement in parallel relation to the axis of said work holder, a tool slide carried by said support adapted to have reciprocatory movement at an angle to said work holder, releasable means adapted to fix the position of said tool support against pressure in one direction and to release said support against pressure in the other direction, means adapted to have movement relatively to said support and adapted to impart reciprocatory movement to said tool slide during such relative movement, and means adapted at a predetermined point in the movement of said last means to release said releasable means, whereby said support has movement with said last means.

21. In a center turning machine tool, a rotatable work holder, a sliding tool support mounted for reciprocatory movement in parallel relation to the axis of said work holder, a tool slide carried by said support adapted to have reciprocatory movement at an angle to the axis of said work holder, a pair of spaced releasable means adapted to respectively fix the position of said support against pressure in the opposed directions of movement of said support and to respectively release said support against pressure in the respective opposite directions of movement, reciprocating means adapted to have movement relatively to said support and adapted to impart movement to said tool slide during such relative movement and spaced means adapted at predetermined points in the respective opposed directions of movement of said last means to release said respective releasable means, whereby said support has movement with said last means.

22. In a center turning machine tool, a rotatable work holder, a sliding tool support mounted for reciprocatory movement in parallel relation to the axis of said work holder, a tool slide carried by said support adapted to have reciprocatory movement at an angle to the axis of said work holder, releasable means adapted to fix the position of said tool support and including toggle means adapted through pressure in one direction to fix the position of said support against pressure in one direction and to release said support against pressure in the other direction, means adapted to have movement relatively to said support and adapted to impart reciprocatory movement to said tool slide during such relative movement, and means adapted at a predetermined point in the movement of said last named means to release said releasable means, whereby said means has movement with said last means.

23. In a center turning machine tool, a rotatable work holder, a tool support guide arranged parallel to the axis of said work holder, a slidable tool support mounted for reciprocatory movement with respect to said guide, a tool slide carried by said support, adapted to have reciprocatory movement at an angle to the axis of said work holder, releasable means adapted to fix the position of said tool support with respect to said guide, means adapted to have movement relatively to said support and adapted to impart reciprocatory movement to said tool slide during such relative movement, and means adapted at a predetermined point in the movement of said last means to release said releasable means, whereby said support has movement with said last means.

24. In a center turning machine tool, a rotatable work holder, tool means at opposed sides of the axis of said work holder and each comprising a tool support guide arranged parallel to the axis of said work holder, a slidable tool support mounted for reciprocatory movement with respect to said guide, a tool slide carried by said support adapted to have reciprocatory movement at an angle to the axis of said work holder, releasable means adapted to fix the position of said tool support with respect to said guide, means adapted to have movement relatively to said support and adapted to impart reciprocatory movement to said tool slide during such relative movement, and means adapted at a predetermined point in the movement of said last means to release said releasable means, whereby said support has movement with said last means.

25. In a center turning machine tool, a rotatable work holder, tool means at opposed sides of the axis of said work holder and each comprising a tool support guide arranged parallel to the axis of said work holder, a slidable tool support mounted for reciprocatory movement with respect to said guide, a tool slide carried by said support adapted to have reciprocatory movement at an angle to the axis of said work holder, the slide of one tool means adapted to have movement in opposed direction to the movement of the slide of the other tool means, releasable means adapted to fix the position of said tool support with respect to said guide, means adapted to have movement relatively to said support and adapted to impart reciprocatory movement to said tool slide during such relative movement, and means adapted at a predetermined point in the movement of said last means to release said releasable means, whereby said support has movement with said last means.

26. In a center turning machine tool a continuously rotating carrier, a plurality of rotatable work holders carried thereby, a sliding tool support mounted for reciprocatory movement in parallel relation to the axis of each of said work holders, a tool slide carried by said support adapted to have reciprocatory movement at an angle to the axis of said work holder, a reciprocating rack adapted to have movement relatively to said support, gear means between said rack and tool slide whereby the rack is adapted to impart reciprocatory movement to said tool slide during such relative movement, and means adapted at a predetermined point in the movement of said rack to cooperatively connect said support thereto, whereby said support has movement with said rack.

27. In a center turning machine tool, a rotatable work holder, a sliding tool support mounted for reciprocatory movement in parallel relation to the axis of said work holder, a tool slide carried by said support adapted to have reciprocatory movement at an angle to the axis of said work holder, a reciprocating rack adapted to have movement relatively to said support, a nut on said tool slide, a worm engaging said nut, a gear on said worm meshing with said rack whereby the rack is adapted to impart reciprocatory movement to said tool slide during such relative movement, and means adapted at a predetermined point in the movement of said rack to cooperatively connect said support thereto, whereby said support has movement with said rack.

28. In a center turning machine tool, a rotatable work holder, a slidable tool support mounted for reciprocatory movement in parallel relation to the axis of said work holder, a tool slide carried by said support adapted to have reciprocatory movement at an angle to the axis of said work holder, means adapted to have movement relatively to said support, means between said last means and said tool slide whereby said last means is adapted to impart reciprocatory movement to said tool slide during such relative movement, a releasable connection between said tool slide and said last means whereby independent movement may be imparted to either, and means adapted at a predetermined point in the movement of said last means to cooperatively connect said support thereto, whereby said support has movement with said last means.

29. In a center turning machine tool a continuously rotating carrier, a plurality of pairs of rotatable work holders and work centering means carried thereby each pair adapted to support the work vertically at both ends, a non-rotatable tool holder also mounted on the carrier in relation to each work holder, reciprocating means for reciprocating said tool holder, a reciprocatory rack, and change gear means between said rack and said reciprocating means whereby the speed of one relative to the other may be varied.

30. In a center turning machine tool a continuously rotating carrier, a plurality of pairs of rotatable work holders and work centering means carried thereby each pair adapted to support the work vertically at both ends, a non-rotatable tool holder mounted on the carrier in relation to each work holder and at opposed sides of the axis of said work holder, reciprocatory means for each of said tool holders for reciprocating them, and drive means common to each of said reciprocating means for simultaneously reciprocating them.

31. In a center turning machine tool, a rotatable work holder, non-rotatable tool holders mounted at opposed sides of the axis of said work holder, reciprocating racks for each of said tool holders for reciprocating them, a drive rack common to each of said reciprocating racks and gear means between said common rack and said reciprocating racks, whereby the latter are simultaneously reciprocated.

32. In a center turning machine tool, a rotatable work holder, non-rotatable tool holders mounted at opposed sides of the axis of said work holder, reciprocatory means for each of said tool holders for reciprocating them, drive means common to each of said reciprocating means for simultaneously reciprocating them and change speed means between said common drive means and each of said reciprocating means, whereby the speeds of said reciprocating means may be independently varied with respect to said common drive means and to each other.

33. In a multiple spindle center turning machine having a loading station and including a continuously rotatable carrier, a series of rotatable work holders mounted thereon each adapted to support the work vertically at both ends, a non-rotatable tool holder carried by said carrier in respect to each work holder, and means adapted during the rotation of said carrier to reciprocate the respective tool holders at an angle to the axis of said work holder.

34. In a multiple spindle center turning machine having a loading station and including a continuously rotatable carrier, a series of rotatable work holders mounted thereon adapted to support and rotate the work at one end, a series of center supports carried by said carrier in coaxial relation to said work holders and adapted to support the work at the other end, a non-rotatable tool holder carried by said carrier in respect to each work holder, and means adapted during the rotation of said carrier to reciprocate the respective tool holders at an angle to the axis of the respective work holders.

35. In a multiple spindle center turning machine having a loading station and including a continuously rotatable carrier mounted to rotate about a vertical axis, a series of rotatable work holders mounted thereon for rotation about a vertical axis arranged in radially spaced relation about the axis of said carrier, a series of center supports carried by said carrier in coaxial relation to said work holders adapted to support the work at the other end, a non-rotatable tool holder carried by said carrier in respect to each work holder, and means movable in parallel relation to the axis of said carrier adapted to reciprocate the respective tool holders at an angle to the axis of the respective work holders.

36. In a multiple spindle center turning machine having a loading station and including a rotatable carrier mounted to rotate about a vertical axis, a series of rotatable work holders mounted thereon for rotation about vertical axes arranged in radially spaced relation about the axis of said carrier, a series of center supports carried by said carrier in coaxial relation to said work holders adapted to support the work at the other end, a non-rotatable tool holder carried by said carrier in respect to each work holder, reciprocatory means for each tool holder adapted to reciprocate it, means common to the several reciprocatory means for imparting successive and equal reciprocatory movement thereto as the carrier is rotated, and means between said last means and said respective tool holders whereby the relative speeds of said tool holders may be varied with respect to said means and to each other.

37. In a multiple spindle center turning machine having a loading station and including a rotatable carrier mounted to rotate about a vertical axis, a series of rotatable work holders mounted thereon for rotation about vertical axes arranged in radially spaced relation about the axis of said carrier, a series of center supports carried by said carrier in coaxial relation to said work holders adapted to support the work at the other end, a non-rotatable tool holder carried by said carrier in respect to each work holder, reciprocatory means for each tool holder adapted to reciprocate it, means common to the several reciprocatory means for imparting successive and equal reciprocatory movements thereto as the carrier is rotated, and means between said last means and said respective tool holders whereby the relative extents of movements of said tool holders may be varied with respect to said means and to each other.

38. In a multiple spindle center turning machine having a loading station and including a rotatable carrier mounted to rotate about a vertical axis, a series of rotatable work holders mounted thereon for rotation about vertical axes, arranged in radially spaced relation about the axis of said carrier, a series of center supports carried by said carrier in coaxial relation to said work holders and adapted to support the work on the other end, a non-rotatable tool holder carried by said carrier in respect to each work holder, means adapted during the rotation of said carrier to reciprocate the respective tool holders at an angle to the axis of the respective work holders, and means whereby the speeds of the respective tool holders may be varied with respect to each other.

39. In a multiple spindle center turning machine having a loading station and including a continuously rotatable carrier mounted to rotate about a vertical axis, a series of rotatable work holders mounted thereon for rotation about vertical axes arranged in radially spaced relation about the axis of said carrier, a series of center supports carried by said carrier in coaxial relation to said work holders and adapted to support the work on the other end, a non-rotatable tool holder carried by said carrier in respect to each work holder, means adapted during the rotation of said carrier to reciprocate the respective tool holders at an angle to the axes of the respective work holders, and means whereby the extent of movement of the respective tool holders may be varied with respect to each other.

40. In a multiple spindle center turning machine having a loading station and including a continuously rotatable carrier mounted to rotate about a vertical axis, a series of rotatable work holders mounted thereon for rotation about vertical axes arranged in vertically spaced relation about the axis of said carrier, a series of center supports carried by said carrier in coaxial relation to said work holder adapted to support the work at the other end, a non-rotatable tool holder carried by said carrier in respect to each work holder, and means adapted during the rotation of said carrier to reciprocate each of said carriers successively in two directions, one being at an angle to the work holders.

41. In a multiple spindle center turning machine having a loading station and including a rotatable carrier mounted to rotate about a vertical axis, a series of rotatable work holders mounted thereon for rotation about vertical axes arranged in radially spaced relation about the axis of said carrier, a series of center supports carried by said carrier in coaxial relation to said work holders adapted to support the work at the other end, a non-rotatable tool holder carried by said carrier in respect to each work holder, means adapted during the rotation of said carrier to reciprocate each of said carriers successively in two directions, one being at an angle to the work holders, and means whereby the relative extents of each tool holder may be varied with respect to each other and with respect to the corresponding movements of the other two holders.

42. In a multiple spindle turning machine having a loading station and including a rotatable carrier mounted to rotate about a vertical axis, a series of rotatable work holders mounted thereon for rotation about vertical axes arranged in radially spaced relation about the axis of said carrier, a plurality of non-rotatable tool holders carried by said carrier and arranged in pairs in opposed relation at each side of the axis of the respective work holders, and means adapted during the rotation of said carrier to reciprocate the respective tool holders.

43. In a multiple spindle turning machine having a loading station and including a rotatable carrier mounted to rotate about a vertical axis, a series of rotatable work holders mounted thereon for rotation about vertical axes arranged in radially spaced relation about the axis of said carrier, a plurality of non-rotatable tool holders carried by said carrier and arranged in pairs in opposed relation at each side of the axis of the respective work holders, means adapted during the rotation of said carrier to reciprocate the respective tool holders, and means whereby the relative speeds of the tool holders of each of said pairs may be varied with respect to each other and with respect to the tool holders of the other pairs.

44. In a multiple spindle turning machine having a loading station and including a rotatable carrier mounted to rotate about a vertical axis, a series of rotatable work holders mounted thereon for rotation about vertical axes arranged in radially spaced relation about the axis of said carrier, a plurality of non-rotatable tool holders carried by said carrier and arranged in pairs in opposed relation at each side of the axis of the respective work holders, means adapted during the rotation of said carrier to reciprocate the respective tool holders, and means whereby the relative extents of movements of the tool holders of each of said pairs may be varied with respect to each other and with respect to the tool holders of the other pairs.

45. A continuous turning machine of the class described including a continuously rotatable carrier, rotatable work holders mounted therein adapted to support and rotate the work at one end, center support co-axial with said work holders adapted to support the work at the other end, non-rotatable tool holders also carried by said carrier, and means for feeding said tools to and fro in two directions, one being at an angle to the other, the respective to and fro movements being spaced and parallel relation to each other.

46. In a center turning machine of the class described, a continuous plurality of rotatable carriers, a rotatable work holder, mounted therein, adapted to support and rotate the work at one end, a plurality of center supports co-axial with said work holder adapted to support the work at the other end, a non-rotatable tool holder, and means for feeding said tool holder to and fro in two directions, one being at an angle to the other, the respective to and fro movements being in spaced and parallel relation to each other.

47. A continuous turning machine of the class described, including a continuously rotating rotor, carrying a circular series of individually rotatable work holders, a circular series of pairs of tool holders mounted on the rotor, each pair being in opposed relation with respect to the axis of the respective work holders, and means for causing reciprocation of the tool holders.

48. A continuous turning machine of the class described including a continuously rotating rotor carrying a circular series of individually rotatable work holders adapted to support the work at one end, a circular series of non-rotatable tool holders mounted on the rotor, center supports co-axial with said work holders adapted to support the work at the other ends, power means for causing reciprocation of the tool holders, and means for individually regulating the speed of the respective tool holders independent of each other.

49. A continuous turning machine of the class described, including a continuously rotating rotor carrying a circular series of individually rotatable work holders to support and rotate the work at one end, center supports co-axial with said work holders adapted to support the work at the other ends, a circular series of non-rotatable tool holders mounted on the rotor, power means for causing reciprocation of the tool holders, and means for individually regulating the extent of movement of the respective tool holders independent of each other.

50. A continuous turning machine of the class described, including a continuously rotating rotor carrying a circular series of individually rotatable work holders, a circular series of non-rotatable tool holders mounted upon the carrier, center supports co-axial with said work holders adapted to support the work at the other ends, and power means for causing reciprocation of the tool holders, the successive tool holders adapted to perform the same operation upon a plurality of articles.

51. A continuous turning machine of the class described, including a continuously rotating rotor, a circular series of individually rotatable work holders mounted in the carrier, a circular series of non-rotatable tool holders also mounted on the carrier, center supports co-axial with said work holders adapted to support the work at the other ends, and power means for causing reciprocation of the tool holders, the successive tool holders adapted to perform different operations upon the same article.

52. In a continuous turning machine, a continuously rotating carrier, a plurality of rotatable work holders carried thereby each adapted to support a piece of work at one end, centering means on said carrier for supporting the other end of the piece of work, a circular series of equally spaced guideways on said carrier one in relation to each work holder, a non-rotatable tool holder mounted on said rotating carrier at opposite sides of the axis of each work holder, reciprocating means for said tool holders, and change speed means between said reciprocating means and said tool holders whereby the speed of the tool holders may be varied with respect to the speed of the reciprocating means.

53. In a center turning machine tool, a continuously rotating carrier, a plurality of pairs of rotatable work holders, work centering means carried thereby, a series of non-rotatable tool holders mounted on the carrier at opposite sides of the axis of said work holders and adapted to have reciprocatory movement, reciprocatory tool actuating members one for each of said work holders, means having fixed limit of travel at a fixed rate for reciprocating all of said tool actuating members, and means between these tool actuated members and the said tool holders for imparting to each tool holder an independent and variable length of reciprocatory movement at an independent and variable rate of movement.

Signed at Bridgeport in the county of Fairfield and State of Connecticut this 30th day of April A. D. 1925.

EDWARD P. BULLARD, JR.